M. KELLY.
Wire-Fence.
No. 208,399.          Patented Sept. 24, 1878.
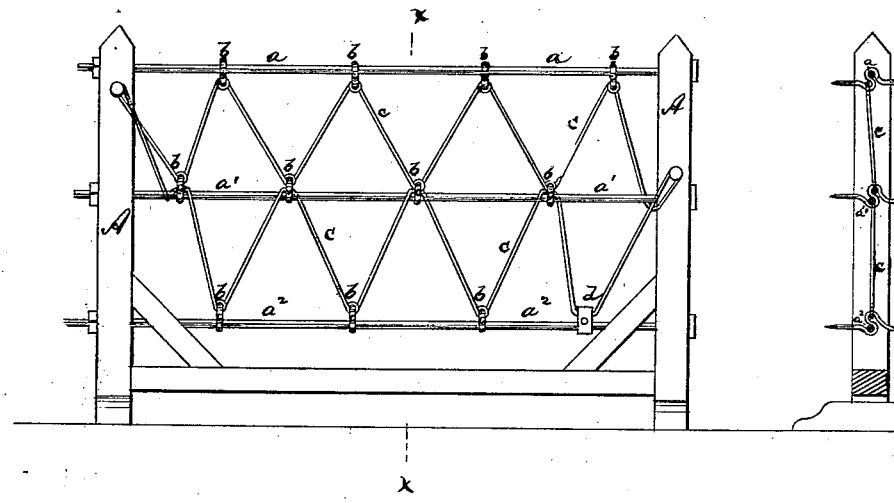
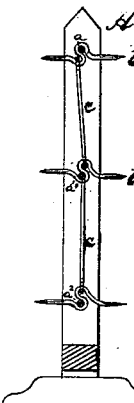
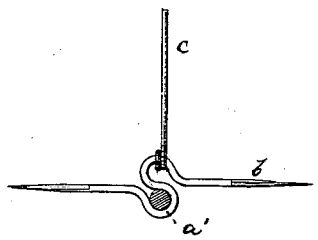
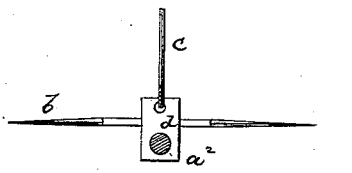
Witnesses:
John C. Tunbridge
James Tink
Inventor:
Michael Kelly
by his attorney
A. v. Briesen

UNITED STATES PATENT OFFICE.

MICHAEL KELLY, OF NEW YORK, N. Y.

IMPROVEMENT IN WIRE FENCES.

Specification forming part of Letters Patent No. 208,399, dated September 24, 1878; application filed August 16, 1878.

*To all whom it may concern:*

Be it known that I, MICHAEL KELLY, of New York city, county and State of New York, have invented a new and Improved Wire Fence, of which the following is a specification:

This invention relates to an improved wire fence which will effectively prevent cattle or other animals from passing over or through the same.

The invention consists in the combination of the horizontal wires with short pointed wires placed at right angles to the same, and attached substantially in the manner hereinafter described.

The invention also consists in the details of construction hereinafter more fully pointed out.

In the accompanying drawing, Figure 1 is a side elevation of my improved wire fence. Fig. 2 is a vertical transverse section on the line $x$ $x$, Fig. 1. Figs. 3 and 5 are detail views of one of the pointed wires, and Fig. 4 a detail view of a modification thereof.

Similar letters of reference indicate corresponding parts in all the figures.

The letters A A represent the two uprights or posts of a fence. The same are connected by three (more or less) parallel horizontal wires, $a$ $a^1$ $a^2$, which are passed through holes in the uprights A A, or are otherwise secured thereto in the customary or in suitable manner.

$b$ $b$ are a series of short wires, pointed at both ends, and hung on the wires $a$ $a^1$ $a^2$ at preferably regular intervals. They serve to prevent the cattle from passing over or through the fence, and at the same time serve as connecting instruments for the weaving of the fence. The wires $b$ project at right angles from the horizontal wires, and are preferably made with an S-shaped bend at their center, as shown in Fig. 3, so that they may be hung on the wires $a$ $a^1$ $a^2$. The wires $b$ should be arranged alternately on the several horizontal wires, so that the wires $b$ which are hung on the uppermost and lowermost wires, $a$ $a^2$, (if three such wires are used,) are in the same vertical plane, while the wires $b$ on the central wire, $a^1$, are arranged midway horizontally between them.

I connect the barbed wires $b$ $b$ by zigzag wires $c$ to the wires $a$ $a^1$, &c.—that is to say, one wire $c$ connects the pointed wires $b$, which are hung on the wires $a$ and $a^1$, by being coiled around or passed through the S-shaped portions of such wires, in manner clearly indicated in Figs. 1 and 3. A second zigzag wire $c$ connects in similar manner the wires $b$ on the horizontal wires $a^1$ $a^2$.

It will be seen that the pointed wires $b$ are in this way securely held in place, while at the same time the alternate angles of the wires $c$ are connected to the horizontal wires by the loops of the barbed wires, thereby strengthening the fence and preventing animals from passing through the same.

The wires $b$ may terminate in three-sided bayonet-points, as shown in Fig. 5, or in points of other form.

In Fig. 4 I have shown a modification of the barbed wires $b$. Instead of making the barbed wires with an S-shaped central bend, they are made straight, and pass through a block, $d$, which is provided with perforations, through which the wires $a$ and $c$ may pass.

The above-described fence may be readily erected, is inexpensive, and will effectively prevent animals from passing over or through the same. It is, moreover, very durable, as all its parts are intimately connected.

I claim—

The combination, in a wire fence, of the horizontal wires $a$ $a^1$ $a^2$ with the barbs $b$, which are hung bodily on the horizontal wires in alternate vertical rows, and with the zigzag wires $c$ $c$, each of which connects alternately the barbs on two horizontal wires, all being arranged in such a way that each of the barbs on the central wire, $a^1$, is connected to both wires $c$ $c$ above and below the same, while the barbs on the uppermost and lowermost wires, $a$ $a^2$, are connected, respectively, to only one of such zigzag wires $c$, substantially as and for the purpose herein shown and described.

The foregoing description of my invention signed by me this 14th day of August, 1878.

MICHAEL KELLY.

Witnesses:
   F. V. BRIESEN,
   J. TURK.